United States Patent Office 2,986,257
Patented May 30, 1961

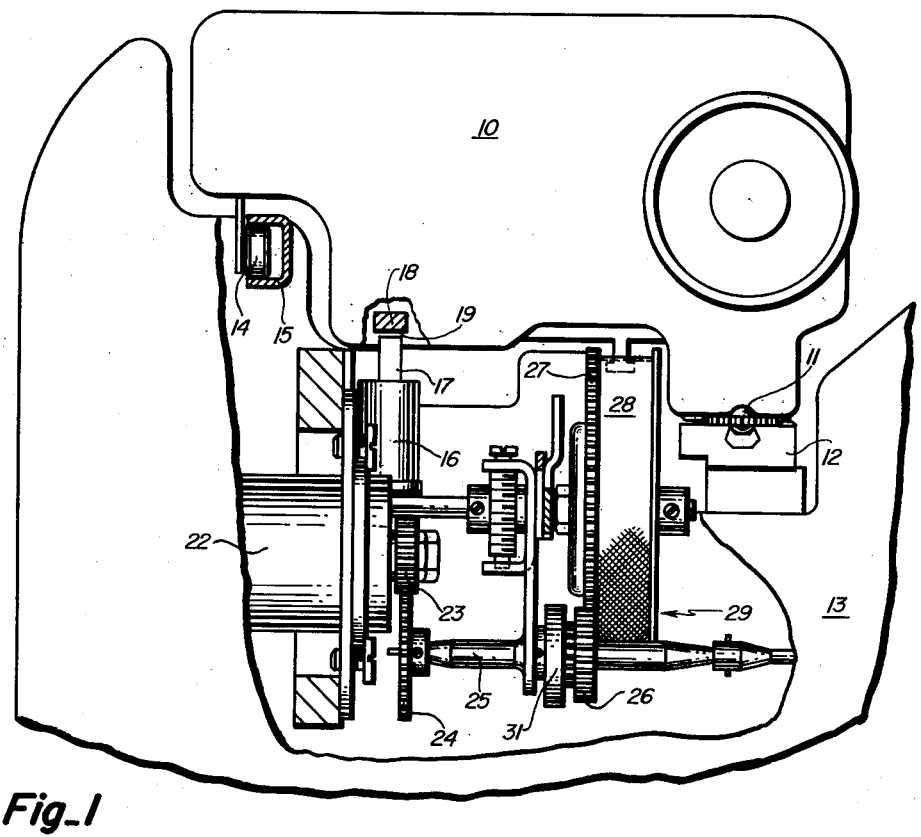
Fig_1
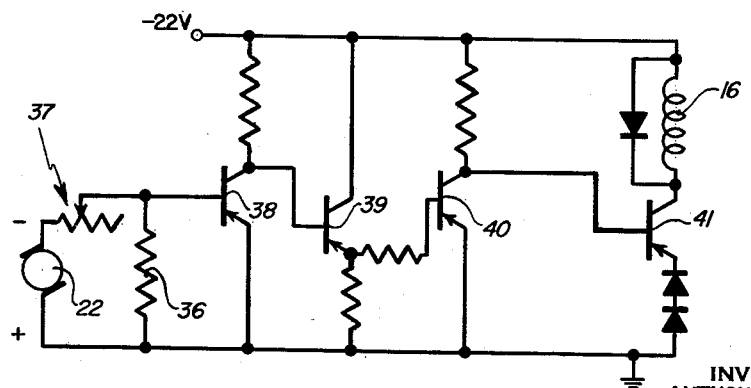
Fig_2
INVENTOR
ANTHONY D'ONOFRIO
BY Thomas S. Ross
Joseph R. Spalla
ATTORNEYS

2,986,257

TABULAR BRAKING SYSTEM FOR TYPEWRITERS AND LIKE BUSINESS MACHINES

Anthony D'Onofrio, West Hartford, Conn., assignor to Royal McBee Corporation, Port Chester, N.Y., a corporation of New York Filed Nov. 18, 1960, Ser. No. 70,343

4 Claims. (Cl. 197—64)

This invention relates to tabular braking systems for typewriters or like business machines; more particularly it relates to a servo controlled tabular braking system having electromagnet braking means for applying a carriage braking force which is a function of the velocity of the carriage during tabulating movement.

Heretofore the braking of a carriage during tabulating movement has been controlled by velocity sensitive devices such as mechanical centrifugal force braking devices. These devices due to system inertia are not sufficiently fast acting such that there are times when no braking occurs and other times when the braking is great enough to stop the carriage. As a consequence the terminal velocity of a carriage so controlled, when it arrives at differentially spaced columnar positions, varies greatly from one position to another.

In accordance with the present invention there is provided means for generating an electrical signal whose amplitude is a function of the velocity of the carriage during tabulation and a braking magnet responsive to said signal for applying a braking force to the carriage which is proportional to the amplitude of the velocity generated signal.

An object of the invention is to provide an improved brake or controller for properly retarding the carriage after it is released for a tabulating run.

Another object of the invention is to provide constant velocity carriage movement over any length of tabulating run.

Still another object of the invention is in the provision of a rapid action servo controlled carriage braking system.

A further object of the invention is to provide apparatus for controlling the velocity of a carriage during tabulating movement to any desired value.

A still further object of the invention is in the provision of circuitry for controlling in a simple fashion the velocity of a carriage during tabulating movement.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Figure 1 is a partial end view of a typewriter having a carriage mounted for movement on the typewriter frame thereof and showing elements in accordance with the invention associated with a spring motor operatively mounted to urge the carriage in tabulating direction; and Figure 2 is a schematic diagram of circuitry in accordance with the invention for energizing the braking magnet.

Referring now to the drawings there is shown in Figure 1 a carriage generally designated by reference character 10 supported by ball bearings 11 for movement on a forwardly mounted lower track 12 secured to the typewriter frame 13, and by a roller 14 depending from the carriage riding in a rearwardly mounted track 15 secured to the typewriter frame. As shown in Figures 1 and 2 an electromagnet 16 capable of exerting a downward pull of up to 60 pounds is located on the frame adjacent the center post of the typewriter with its pole piece 17 spaced from a transverse rail 18 of magnetic material mounted on the underside of the carriage. While not so shown due to space limitations inherent in the machine design illustrated, the rail is preferably placed intermediate the carriage bearing supports 11 and 14 so that the downward pull of the magnet 16 will be shared equally by the front and rear bearing supports. When centrally located there will be no tendency to rotate the carriage should there by any play inherent in the supports thereby reducing the tendency to change the air gap spacing 19 between rail 18 and magnet pole piece 17. In the embodiment shown, however, though the rail was not centrally located, operation was entirely satisfactory.

With further reference to Figure 1 there is shown a small generator 22 mounted on the typewriter frame having a gear 23 on its armature shaft meshing with a gear 24 driven by a shaft 25 which carries on its other end a gear 26. Gear 26 is driven by the gear 27 on the barrel 28 of a spring motor 29. As is understood in the art the spring barrel is connected to one end of the carriage by a draw band to move the carriage in tabulating direction. The mechanism 31 between gears 24 and 26 is such, as is understood in the art, that gear 24 is driven only during movement of the spring barrel 28 in a tabulating direction. Hence movement of the carriage in tabulating direction causes the generator armature to rotate and a signal to be generated in the field coils thereof which is proportional to the velocity of the carriage. This signal is amplified by transistor amplifiers (Figure 2) and then applied to the braking magnet 16 which exerts a magnteic pull on the rail 18, thereby in effect increasing or decreasing the frictional load presented to the spring motor 29 whereby the carriage velocity is controlled. Normally the carriage velocity increases as the carriage moves in tabulating direction. The increasing signal output from the generator 22 is applied to the braking magnet 16 which slows down the carriage and reduces the output signal which reduces the braking force. Dynamically because of the mass and forces involved hunting about a set constant velocity is not noticeable.

Turning now to Figure 2 there is shown a schematic diagram of the circuitry involved. As shown in Figure 2 the rate generator 22 is connected across a resistor 36 through a velocity set potentiometer 37. The high side of resistor 36 is connected to the base electrode of a transistor amplifier 38 whose collector is D.C. coupled to the base of an emitter follower transistor 39. The output of the emitter follower transistor 39 is D.C. coupled to a second power amplifier transistor 40 whose output is D.C. coupled to the base of a final transistor amplifier 41 which has the braking magnet 16 in its collector circuit.

In quiescent condition, with no signal from the rate generator 22 transistor amplifier 38 is cut off while emitter follower transistor 39 and transistor amplifier 40 are conducting and output amplifier 41 is cut off.

The movement of the carriage in tabulating direction will generate a signal across the generator terminals of the polarity shown thereby rendering transistor 38 conductive an amount determined by the potentiometer setting.

Conduction of transistor 38 reduces conduction through transistors 39 and 40 and the negative going collector of transistor 40 renders transistor 41 conductive thereby energizing the braking magnet 16 which generates a magnetic force proportional to the collector current drawn such as to prevent an increase in carriage velocity above that determined by the potentiometer setting by braking the carriage, thereby maintaining carriage velocity constant. If lower carriage velocities are desired the potentiometer arm may be moved toward the generator terminal which increases the voltage drop across resistor 36 thereby driving transistors 38 and 41 into conduction in response to signals of lower magnitude at the generator terminals thereby limiting carriage velocity to a lower constant value.

While the circuitry shown includes three stages of amplification it should be understood that if the ratio between gears 23 and 24 is multiplied to give a larger output signal fewer stages of amplification could be employed.

It should be understood, that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. In a business machine having a carriage freely movable under the control of the spring motor during a tabulating run, means responsive to tabulating movement for generating a signal proportional to the velocity of carriage movement, and means responsive to said signal for braking said carriage.

2. Apparatus as recited in claim 1 wherein said last named means includes means for varying the magnitude of said generated signal thereby to control the braking force applied to said carriage.

3. In a business machine having a frame and a carriage supported on and movable relative to said frame, means for moving said carriage in tabulating direction, carriage velocity sensing means operative during tabulating movement, means responsive to said velocity sensing means for generating a braking force, and means on said carriage responsive to said braking force for increasing the load on said carriage moving means thereby braking said carriage.

4. In a business machine having a frame and a carriage supported on and movable relative to said frame, a spring motor for moving said carriage in tabulating direction, means geared to said spring motor for generating a signal related to carriage velocity in tabulating direction, electromagnet means energizable in response to signals corresponding to velocities above a desired velocity, and means on said carriage responsive to the magnetic force exerted by said electromagnet for increasing the load presented by said carriage to said spring motor thereby to brake said carriage.

No references cited.